Patented July 3, 1951

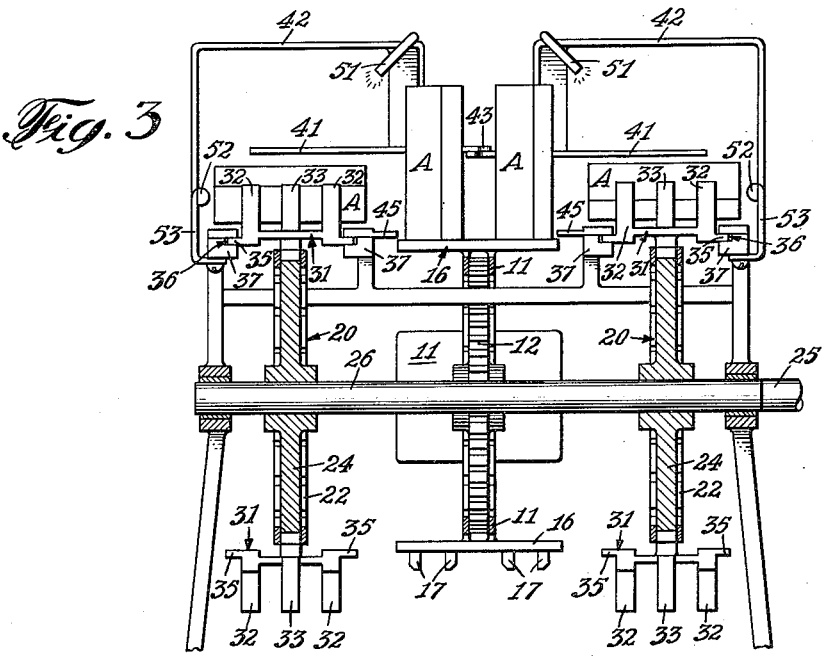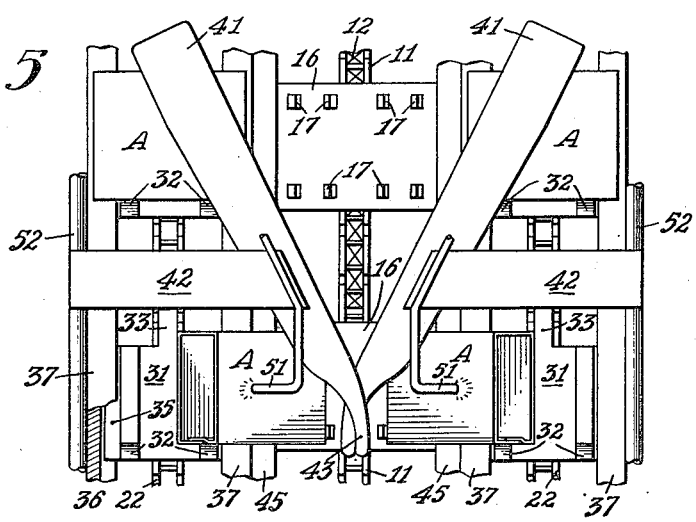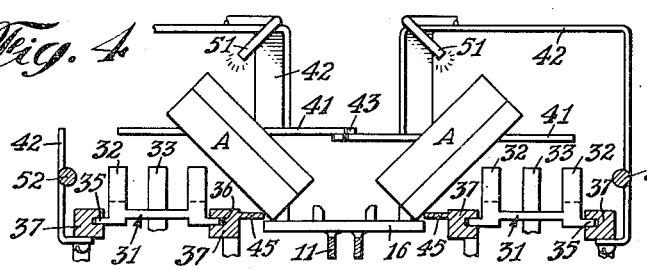

2,558,774

UNITED STATES PATENT OFFICE 2,558,774

DISCHARGE CONVEYER MECHANISM FOR ARTICLES

Ronald E. J. Nordquist, Maplewood, and Frank F. Borkmann, Union, N. J., assignors to American Can Company, New York, N. Y., a corporation of New Jersey Application May 14, 1947, Serial No. 748,040

4 Claims. (Cl. 198—33)

1

The present invention relates to a discharge conveyor mechanism for articles such as container bodies or the like and has particular reference to devices for turning the articles from one position into another position to facilitate discharge of the articles to a suitable place of deposit.

An object of the invention is the provision in a discharge conveyor mechanism of devices wherein articles passing from a machine may be shifted into an advantageous position before discharge to facilitate the discharge of the articles to a suitable place of deposit.

Another object is the provision in such a discharge conveyor mechanism of devices wherein the articles may be turned from a vertical position into a horizontal position to facilitate subsequent handling of the articles after discharge.

Another object is the provision in such a discharge conveyor mechanism of devices wherein articles traveling in a double lane continuous procession may be effectively divided into two separate single lanes for discharge to separate subsequent operation machines or other suitable places of deposit.

Another object is the provision of such discharge devices which are effective for shifting the articles from a predetermined position on one conveyor to another predetermined position on another conveyor at high speed rates of travel while maintaining a predetermined spacing and timing of the articles relative to each other.

Numerous other objects and advantages of the invention will be apparent as it is better understood from the following description, which, taken in connection with the accompanying drawings, discloses a preferred embodiment thereof.

Referring to the drawings:

Fig. 3 is an enlarged sectional view taken substantially along the line 3—3 in Fig. 2, with parts broken away;

Fig. 4 is a fragmentary view similar to Fig. 3 and showing the container bodies in a different position; and Fig. 5 is a fragmentary top plan view of the parts and the container bodies as shown in Fig. 4.

Figure 1:
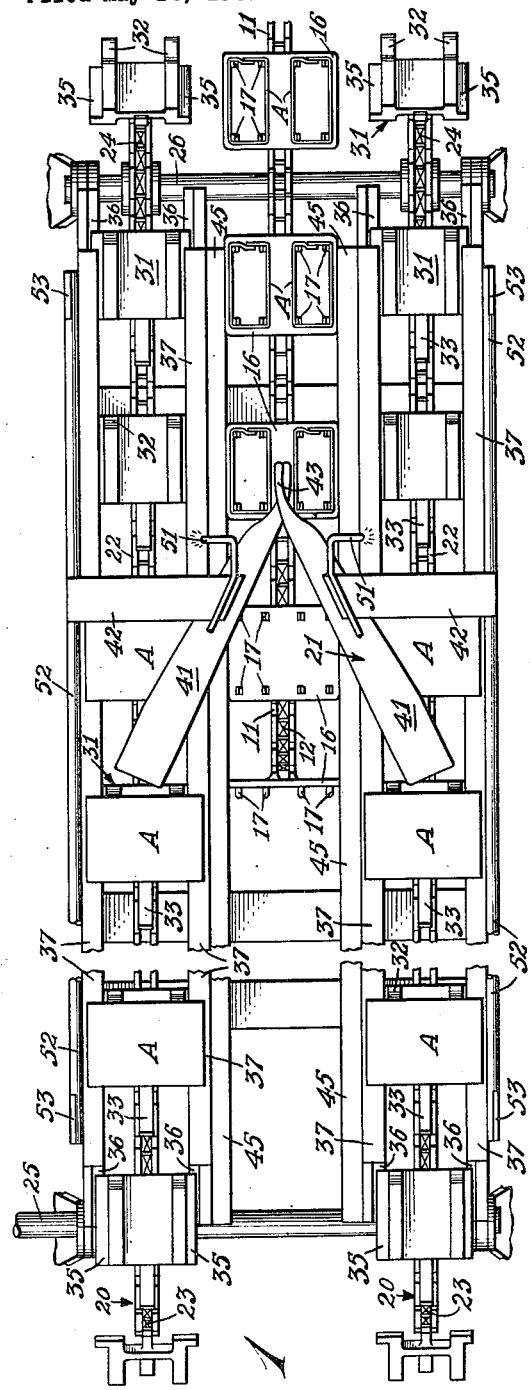
Figure 1 is a top plan view of a conveyor mechanism having container bodies in place thereon and embodying the instant invention, with parts broken away.

As a preferred embodiment of the instant invention the drawings illustrate a discharge conveyor mechanism for turning container bodies A (Figs. 1 and 2), moving in double file continuous processions, from a vertical position into a horizontal position and for carrying them in the horizontal position in single file to any suitable place of deposit. The container bodies A shown in the drawings as an exemplary embodiment are of the rectangular shaped fibre material type used for frozen foods and other products.

The container bodies A to be discharged as an incident to the body forming operations, or other prior treatment, are disposed in a vertical on-end position and arranged in a double row or lane, continuous procession moving along a predetermined path of travel on a feeding conveyor 11 (Figs. 1 and 2) which may form a part of a more elaborate machine for performing operations on the bodies carried therethrough. The conveyor 11 shown in the drawings is of the endless chain type disposed in a vertical plane for feeding the bodies in a horizontal direction, and operates over a sprocket 12 (see also Fig. 3) mounted on a shaft 13 journalled in suitable bearings formed in a frame which may constitute the main frame of the machine.

The advancing container bodies A are supported on cradles 16 secured to the conveyor 11 at spaced intervals. Each cradle preferably supports two container bodies disposed in side-by-side or parallel or double file relationship. Retainer lugs 17 projecting up from the cradles 16 extend up into the bodies and hold them in a predetermined location while traveling with the conveyor. There are four of these retainer lugs for each body and they are located so as to engage the body adjacent its four corners.

Figure 2:
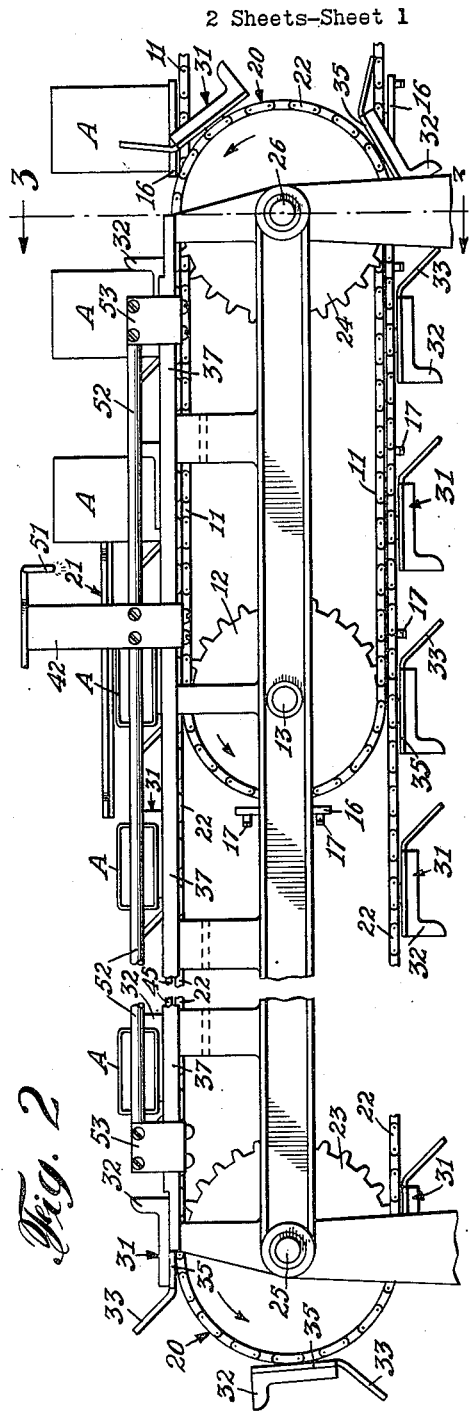
Fig. 2 is a side elevation of the mechanism and the container bodies shown in Fig. 1, with parts broken away.

The conveyor 11 carries the upright bodies into a discharge mechanism which includes a pair of discharge conveyors 20 and a turnover device 21. The discharge conveyors 20 are located in spaced and parallel relation with each other and with the feeding conveyor 11 and are disposed one on each side of the body feeding run of the feeding conveyor 11 as best shown in Figs. 1 and 3.

The discharge conveyors 20 comprise continuously operating endless chains 22 which operate over vertical driving sprockets 23 and idler sprockets 24 mounted respectively on a drive shaft 25 and an idler shaft 26 journaled in suitable bearings formed in the main frame of the machine. The driving shaft 25 is rotated in any suitable manner in time with the feed conveyor 11 and thus operates the discharge conveyors at the same lineal speed as that of the feeding conveyor.

Each of the discharge conveyors 20 is provided with container body carriers 31 which are secured to the conveyor chains 22 at spaced intervals, which spacing corresponds to the spacing of the cradles 16 on the feeding conveyor 11. The body carriers 31 are formed with two rear body locating lugs 32 which extend up from the top of the carriers and an upwardly curved holding lug 33 which extends outwardly from the forward edge of the carriers.

The two longitudinal edges of the carriers 31 are formed with tongues 35 which enter into and slide along grooves 36 in side guides 37, when the carriers travel along the upper runs of the discharge conveyors. These guides 37 are secured to the main frame of the machine and extend along the full length of the upper runs of the conveyors and support the carriers against sagging. The carriers are thus maintained in a horizontal plane while traveling along the upper runs of the conveyors.

The turnover device 21 includes a pair of horizontally disposed divergent flat guide or cam plates or deflectors 41 which extend across the paths of travel of the feeding conveyor 11 and the discharge conveyors 20 in substantially V-shape. These deflectors are secured to inverted U-shaped brackets 42 bolted to the main frame. The inner ends of the deflectors are formed with a curved slender nose 43.

The two deflectors 41 are disposed at an angle to each other and with their noses adjacent each other at the middle of the path of travel of the advancing run of the feeding conveyor 11 so that each deflector extends outwardly at a receding angle from the middle of the path of travel of the double lane of bodies on the feed conveyor 11 to a position across one of the single discharge conveyors as best shown in Fig. 1. The deflectors are spaced above the conveyors a distance sufficient to engage the moving bodies adjacent their upper ends.

Hence as the double lane or file of bodies on the feed conveyor 11 approaches the discharge mechanism, they pass one on each side of the noses 43 of the deflectors 41 and separately engage against the curved cam edges of the noses as shown in Fig. 1. As the bodies continue to advance with the feeding conveyor, they ride along the outer cam edges of the deflectors and are thus forced or swept or wedged outwardly in a direction away from each other and toward the discharge conveyors 20 as shown in Figs. 4 and 5.

This outward deflection of the bodies pivots or hinges or trips them on the cradles 16 and brings the outer side wall of the bodies into engagement with a fulcrum rail 45 which serves as a pivot point for the bodies and thus starts them falling through an arc of about 90° from their vertical position into a horizontal position toward the discharge conveyors 20. The fulcrum rail 45 projects laterally from the inner guide rail 37 and extends along the feeding conveyor. Of the two bodies on each cradle 16, one falls or trips toward one discharge conveyor and the other falls or trips toward the opposite discharge conveyor. An air nozzle 51 may be disposed above and adjacent each deflector 41 for directing a jet of air against each of the falling bodies, thus hastening their descent into a horizontal position. These nozzles receive compressed air from any suitable source of supply.

The horizontally fallen or tripped bodies A are received in the body carriers 31 on the discharge conveyors 20 and are thus carried in spaced and timed order by these conveyors to any suitable place of deposit. A guide rail 52 adjacent the outer edge of the path of travel of the fallen bodies retains the bodies in place in the carriers while the retainer lugs 32, 33 of the carriers hold the received bodies in a predetermined position in the carriers. The guide rail 52 is secured to brackets 53 bolted to the outer carrier guide.

Thus the double lane of vertically disposed bodies A traveling on the feeding conveyor 11, is divided into two separate single lanes of bodies disposed in a horizontal position for discharge to separate subsequent operation machines or other suitable disposal.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. In a conveyor mechanism for articles such as container bodies and the like, the combination of a feeding conveyor having fixed holding means thereon for engaging and advancing container bodies in a predetermined position, a stationary deflector disposed in the path of travel of said bodies on said feeding conveyor and engageable by the advancing bodies for laterally shifting the bodies from the feeding conveyor, fixed fulcrum means disposed adjacent and cooperating with said deflector for engaging the bottom ends of the laterally shifted bodies to tilt the bodies into angular position, air blast means disposed adjacent said deflector for directing a jet of air against the bodies for facilitating the tilting operation, a pair of synchronized discharge conveyors disposed on opposite sides of said conveyor and in substantially the same horizontal plane therewith for receiving the tilted bodies, and spaced carrier members fixed on said discharge conveyors for individually receiving the tilted container bodies from said feeding conveyor and for removing them from said mechanism.

2. In a discharge conveyor mechanism for articles such as container bodies and the like, the combination of a feeding conveyor for advancing tubular container bodies in double file in upright position along a path of travel, a plurality of fixed spaced upstanding lugs on said conveyor engageable within said tubular bodies to hold the same in fixed upright position on the conveyor, a stationary deflector disposed in the path of travel of said bodies and engageable between said files of advancing bodies for shifting them in opposite lateral directions from said conveyor, a pair of fixed fulcrum rails disposed on opposite sides of said conveyor and cooperating with said deflector for engaging the bottom portions of said laterally shifted bodies and turning them from upright to horizontal position, an air blast nozzle disposed adjacent said deflector for directing a jet of air against the fulcrum engaged bodies to facilitate turning the bodies into horizontal position, and a pair of discharge conveyors disposed on opposite sides of said feeding conveyor for receiving the horizontally positioned bodies from said feeding conveyor and for discharging them from said mechanism.

3. In a conveyor mechanism for articles such as container bodies and the like, the combination of a feeding conveyor for advancing tubular container bodies in multiple file in a vertical position along a path of travel, fixed means on said conveyor for engaging the bottom ends of said bodies to hold the same in spaced upright position on the conveyor, stationary deflector means disposed in the path of travel of said multiple file of bodies and engageable between said files of advancing bodies for shifting the bodies in opposite lateral directions from said feeding conveyor, a pair of fixed fulcrum rails disposed on opposite sides of said conveyor and cooperating with said deflector means for engaging the bottom ends of the laterally shifted bodies to tilt the same from vertical to horizontal position, a plurality of discharge conveyors disposed on opposite sides of said feeding conveyor and moving in synchronism therewith, and a plurality of carrier members arranged in fixed spaced relation on said discharge conveyors for respectively receiving the horizontally positioned bodies from said feeding conveyor and for discharging them from said mechanism.

4. In a discharge conveyor mechanism for articles such as container bodies and the like, the combination of a feed conveyor having spaced cradles thereon for carrying and advancing pairs of vertically disposed bodies in a continuous procession in spaced and timed order, fixed means on said cradles for engaging and yieldably maintaining said bodies in upright position thereon, a pair of discharge conveyors located one on each side of said feeding conveyor and operable in time therewith, a plurality of carriers mounted on said discharge conveyors in a spaced relation corresponding to said cradles on the feed conveyor, a pair of stationary deflectors having cam edges disposed adjacent said feeding conveyor and located in line with the space between the bodies of each pair of bodies advancing with said feeding conveyor and engageable by the bodies for wedging them outwardly away from each other, fixed fulcrum means disposed adjacent each of said deflectors and laterally outwardly of the advancing container bodies, each of said deflectors extending at an angle to said feeding conveyor and having deflecting edges for sweeping the separated bodies from said feeding conveyor into engagement with said fulcrum means for simultaneously tilting the bodies from their vertical position into a horizontal position and for depositing them in the carriers of said discharge conveyors, and guide means adjacent said discharge conveyors for retaining the received and horizontally positioned bodies in their carriers.

RONALD E. J. NORDQUIST.
FRANK F. BORKMANN.

REFERENCES CITED

The following references are of record in the file of this patent:

UNITED STATES PATENTS

| Number | Name | Date |
|---|---|---|
| 1,636,235 | Knowles | July 9, 1927 |
| 1,740,607 | Leary | Dec. 24, 1929 |
| 2,344,461 | Hermani | Mar. 14, 1944 |